(12) United States Patent
Kim

(10) Patent No.: US 9,292,104 B2
(45) Date of Patent: Mar. 22, 2016

(54) FIXED MOUSE

(75) Inventor: Youn Soo Kim, Seoul (KR)

(73) Assignee: Intellectual Discovery, Inc., Seoul (KR)

( * ) Notice: Subject to any disclaimer, the term of this patent is extended or adjusted under 35 U.S.C. 154(b) by 57 days.

(21) Appl. No.: 13/243,055

(22) Filed: Sep. 23, 2011

(65) Prior Publication Data

US 2012/0068929 A1 Mar. 22, 2012

Related U.S. Application Data

(63) Continuation of application No. 13/144,261, filed as application No. PCT/KR2010/000177 on Jan. 12, 2010, now abandoned.

(30) Foreign Application Priority Data

Jan. 13, 2009 (KR) .................. 10-2009-0002570

(51) Int. Cl.
*G06F 3/0338* (2013.01)
(52) U.S. Cl.
CPC .................... *G06F 3/0338* (2013.01)
(58) Field of Classification Search
CPC ..... G06F 3/0338; G06F 3/033; G06F 3/0354; G06F 3/038; G06F 3/039
USPC ................................. 345/156–173
See application file for complete search history.

(56) References Cited

U.S. PATENT DOCUMENTS

| | | | |
|---|---|---|---|
| 5,515,044 A * | 5/1996 | Glatt | 341/22 |
| 5,555,004 A | 9/1996 | Ono et al. | |
| 2004/0017355 A1 * | 1/2004 | Shim | 345/157 |
| 2005/0052425 A1 * | 3/2005 | Zadesky et al. | 345/173 |
| 2007/0273671 A1 | 11/2007 | Zadesky et al. | |
| 2008/0284742 A1 * | 11/2008 | Prest et al. | 345/173 |
| 2009/0225030 A1 * | 9/2009 | Vaananen et al. | 345/163 |
| 2010/0045604 A1 * | 2/2010 | Kim | 345/163 |

FOREIGN PATENT DOCUMENTS

| | | |
|---|---|---|
| CN | 1530816 A | 9/2004 |
| EP | 0616298 A1 | 9/1994 |
| JP | 2004-259243 A | 9/2004 |

(Continued)

*Primary Examiner* — Koosha Sharifi-Tafreshi
*Assistant Examiner* — Chun-Nan Lin
(74) *Attorney, Agent, or Firm* — NSIP Law

(57) ABSTRACT

Disclosed herein is a fixed mouse. The fixed mouse includes a housing which has an insert depression, a movable body, a portion or the entirety of which is inserted into the insert depression, a direction sensing means which detects a direction in which an external force is applied to the movable body and generates a signal used to move a pointer in a corresponding direction, and speed sensing means which detects the intensity of the external force applied to the movable body and generates a signal to vary the speed of the pointer in response to the intensity of the external force. As such, the direction sensing means for moving the pointer and the speed sensing means for controlling the speed of the pointer are independently provided. Therefore, the production, maintenance and repair of the direction sensing means and the speed sensing means can be facilitated. Furthermore, the degree of design freedom for layout of a product is increased. Moreover, the fixed mouse may be configured such that a user selectively uses the function of controlling the speed of the pointer, thus making it convenient for the user.

9 Claims, 18 Drawing Sheets

(56) References Cited

FOREIGN PATENT DOCUMENTS

| KR | 10-0132132 | B1 | 4/1998 |
|----|------------|----|--------|
| KR | 10-0181351 | B1 | 5/1999 |
| KR | 10-0802456 | B1 | 2/2008 |
| WO | 2008-136626 | A2 | 11/2008 |
| WO | WO 2008136626 | * | 11/2008 ............ G06F 3/033 |

* cited by examiner

FIXED MOUSE

CROSS-REFERENCES TO RELATED APPLICATIONS

This application is continuation of application Ser. No. 13/144,261, filed Jul. 12, 2011, which is a U.S. national phase application, pursuant to 35 U.S.C. §371, of PCT/KR2010/000177, filed Jan. 12, 2010, which claims priority to Korean Application No. 10-2009-0002570, filed Jan. 13, 2009. The entire contents of the aforementioned applications are incorporated herein by this reference.

TECHNICAL FIELD

The present invention relates generally to a fixed mouse which can continuously move a pointer without the mouse body having to be continuously moved so that space required to move the mouse body so that the pointer can be moved is no longer required, thus making it more convenient for a user and, particularly, to a fixed mouse which separately has a direction sensing means for moving a pointer and a speed sensing means for controlling a speed at which the pointer moves, thus facilitating the production, maintenance and repair of a product, and being convenient to use.

BACKGROUND ART

Generally, a mouse for a computer may be classified into a mechanical type, an optical type, an optical-mechanical type, etc. mouse. The mechanical mouse detects movement of a ball disposed in the bottom thereof and moves a pointer in response to the movement of the ball. The optical mouse includes a photo sensor which is provided under the lower surface of the mouse. Thus, when the optical mouse moves on a checked pad, the photo sensor senses variation of the checked pattern to detect movement of the optical mouse so that the pointer moves in response to the movement of the optical mouse. The optical-mechanical mouse includes a photo sensor and a wheel having slits. The photo sensor senses movement of the slits of the wheel to detect movement of the optical-mechanical mouse so that the pointer moves in response to the movement of the optical-mechanical mouse.

As stated above, in the conventional technique, a mouse is operated in such a way that when a user moves a mouse, the mouse detects the movement and moves the pointer in response to the movement. Therefore, to move the pointer using a conventional mouse, a space must be present in which the mouse can move.

However, the environment for using the mouse does not always provide sufficient space for moving the mouse. Thus, if the space for moving the mouse is insufficient, the user cannot move the pointer as desired.

Furthermore, in the case of the conventional mouse, as the time a computer is used for increases, fatigue of the wrist of the user increases due to the inconvenience of controlling the mouse which results from friction between the mouse and an underlying pad or support surface, thus causing wrist pain.

In an effort to overcome the above-mentioned problems, a technique which can move a pointer continuously or over a long distance without having to move a mouse continuously or by a long distance was proposed in Korean Patent Application No. 10-2007-44112 which was filed by the applicant of the present invention and entitled 'Fixed Mouse'.

This conventional fixed mouse includes a housing which has a receiving depression therein, a movable body which is installed in the receiving depression, and a sensing means which is provided on an inner side surface of the receiving depression so that when the movable body comes into contact with the sensing means, the sensing means detects movement of the movable body to move a pointer in response to the movement of the movable body. A detailed explanation of the operation of the fixed mouse having the above construction will be omitted.

In this conventional fixed mouse, the sensing means functions both to detect movement of the movable body 200 and move the pointer in the corresponding direction and to control the speed of the pointer in response to a variation in the pressure applied to the sensing means after the movable body 200 has come into contact with the sensing means.

Therefore, the sensing means of the conventional fixed mouse has a complex structure and an increased size. Moreover, there are many restrictions made when determining the installation position of the sensing means, thus reducing the degree of design freedom with respect to a product layout.

Furthermore, because the sensing means conducts both the function of moving the pointer and the function of controlling the speed of the pointer since a pressure has been applied to the sensing means, the speed of the pointer may vary by itself despite the user not wanting to vary the speed of the pointer, thus inconveniencing the user.

In addition, even if either a structure for moving the pointer or a structure for controlling the speed of the pointer malfunctions, it is difficult to repair just the structure which has malfunctioned, or it is impossible to replace just it itself with a new one. Therefore, the entirety of the sensing means must be replaced with a new one, thus increasing the maintenance cost.

SUMMARY OF THE DISCLOSURE

Accordingly, the present invention has been made keeping in mind the above problems occurring in the related art, and is intended to provide a fixed mouse which separately includes a structure to move a pointer and a structure to control the speed of the pointer, thus facilitating the production, maintenance and repair of a sensing means, and increasing the degree of design freedom with respect to a product layout, and which may be configured such that a user can selectively use the function of controlling the speed of the pointer.

In order to accomplish the above object, in an aspect, the present invention provides a fixed mouse, including: a housing having an insert depression; a movable body, a portion or entirety of which is inserted into the insert depression; a direction sensing means detecting a direction in which an external force is applied to the movable body and generating a signal to move a pointer in a corresponding direction; and a speed sensing means detecting an intensity of the external force applied to the movable body and generating a signal to vary a speed of the pointer in response to the intensity of the external force.

The direction sensing means may be provided on either an outer side surface of the movable body or an inner side surface of the insert depression, and the speed sensing means may be provided on a remaining one of the outer side surface of the movable body and the inner side surface of the insert depression.

The direction sensing means may have an annular shape and is provided on a bottom of the insert depression, and the speed sensing means may be provided on either an outer side surface of the movable body or an inner side surface of the insert depression.

The direction sensing means and the speed sensing means may overlap each other and be provided on an outer side surface of the movable body or an inner side surface of the insert depression.

Each of the direction sensing means and the speed sensing means may comprise a plurality of pieces which are arranged at positions spaced apart from each other at regular intervals around an outer side surface of the movable body or an inner side surface of the insert depression, or each of the direction sensing means and the speed sensing means may comprise a single body formed around the entire outer side surface of the movable body or the entire inner side surface of the insert depression.

The direction sensing means may be provided on an outer side surface of the movable body or an inner side surface of the insert depression, and the speed sensing means may be provided on an upper surface of the movable body, a lower surface of the movable body or a bottom of the insert depression.

Furthermore, a lower portion of the movable body may be inserted into the insert depression, and a handle may be provided on an upper portion of the movable body that is disposed outside the insert depression.

In addition, a lower end of the handle may cover a space between an outer side surface of the movable body and an inner side surface of the insert depression.

In another aspect, the present invention provides a fixed mouse, including: a housing; a movable body provided on an outer surface of the housing; a direction sensing means detecting a direction in which an external force is applied to the movable body and generating a signal to move a pointer in a corresponding direction; a speed sensing means detecting an intensity of the external force applied to the movable body and generating a signal to vary a speed of the pointer in response to the intensity of the external force. A boss may be provided on either the housing or the movable body, and a receiving depression is formed in a remaining one of the housing and the movable body so that the boss is inserted into the receiving depression.

The direction sensing means may be provided on either an outer side surface of the boss or an inner side surface of the receiving depression, and the speed sensing means may be provided on a remaining one of the outer side surface of the boss and the inner side surface of the receiving depression.

The direction sensing means and the speed sensing means may overlap each other and be provided on an outer side surface of the boss or an inner side surface of the receiving depression.

The direction sensing means may be provided on an outer side surface of the boss or an inner side surface of the receiving depression, and the speed sensing means may be provided on an upper surface of the movable body, an upper end of the boss, a lower surface of the boss or a bottom of the receiving depression.

Furthermore, an end of the boss may be coupled to a surface of the receiving depression so that when the movable body moves, the boss is inclined in a corresponding direction. The speed sensing means may be provided on an inner side surface of the receiving depression or an outer side surface of the boss.

The receiving depression may be increased in width from a bottom to an open top thereof.

The boss may be increased in diameter to the end thereof.

The direction sensing means may be provided on an upper surface of the movable body.

The direction sensing means may comprise a touchpad or joystick.

The fixed mouse may further include an elastic member applying elastic force to the movable body so that the movable body is prevented from moving when no external force is applied to the movable body.

The direction sensing means may be configured in such a way that when another object comes into contact with direction sensing means or a contact pressure is applied thereto after another object has been put in contact with the direction sensing means, a signal to move the pointer in a corresponding direction is generated.

The direction sensing means may comprise a switch structure or touch sensor structure.

The direction sensing means may be configured in such a way that when another object is close thereto, a signal to move the pointer in a corresponding direction is generated.

The direction sensing means may comprise one selected from among an optical sensor, an ultrasonic sensor and a magnetic sensor.

The speed sensing means may be configured in such a way that when the direction sensing means detects two or more touches or two or more times of contact pressure application within a predetermined period of time, the speed of the pointer increases.

The fixed mouse may further include a movement sensing means provided under a lower surface of the housing, the movement sensing means detecting movement of the housing and generating a signal to move the pointer in response to the movement of the housing.

The fixed mouse may further include a signal transmission switch provided under the lower surface of the housing, the signal transmission switch detecting whether the housing is placed on a support surface, wherein when the housing is placed on the support surface, the movement sensing means is allowed to be operated.

In a further aspect, the present invention provides a fixed mouse, including: a housing; a direction sensing means detecting a direction in which a sideways external force is applied thereto and generating a signal to move a pointer in a corresponding direction; and a speed sensing means detecting an intensity with which an external force is applied thereto in a vertical direction and generating a signal to vary a speed of the pointer in response to the intensity of the external force.

In yet another aspect, the present invention provides a fixed mouse, including: a housing; a direction sensing means detecting an external force applied to a position spaced apart from a reference point and generating a signal used to move a pointer in a direction corresponding to a direction oriented from the reference point to the position at which the external force is applied; and a speed sensing means detecting an intensity of the external force applied thereto and generating a signal to vary a speed of the pointer in response to the intensity of the external force.

The direction sensing means and the speed sensing means may form a touchpad structure and be placed one on top of the other and provided on an upper surface of the housing.

The direction sensing means may have a disk or annular shape formed around the reference point.

The speed sensing means may be configured in such a way that when the direction sensing means detects two or more touches or two or more times of contact pressure application within a predetermined amount of time, the speed of the pointer increases.

The fixed mouse may further include a movement sensing means provided under a lower surface of the housing, the movement sensing means detecting movement of the housing and generating a signal to move the pointer in response to the movement of the housing.

The fixed mouse may further include a signal transmission switch provided under the lower surface of the housing, the signal transmission switch detecting whether the housing is placed on a support surface, wherein when the housing is placed on the support surface, the movement sensing means is allowed to be operated.

In a fixed mouse according to the present invention, a direction sensing means for moving a pointer and a speed sensing means for controlling the speed of the pointer are independently provided. Therefore, the production, maintenance and repair of the direction sensing means and the speed sensing means can be facilitated. Furthermore, the degree of design freedom with respect to a product layout is increased. Moreover, the fixed mouse may be configured such that a user selectively uses the function of controlling the speed of the pointer, thus making it convenient for the user.

DETAILED DESCRIPTION OF THE DISCLOSURE

Hereinafter, preferred embodiments of the present invention will be described in detail with reference to the accompanying drawings.

Figure 1:
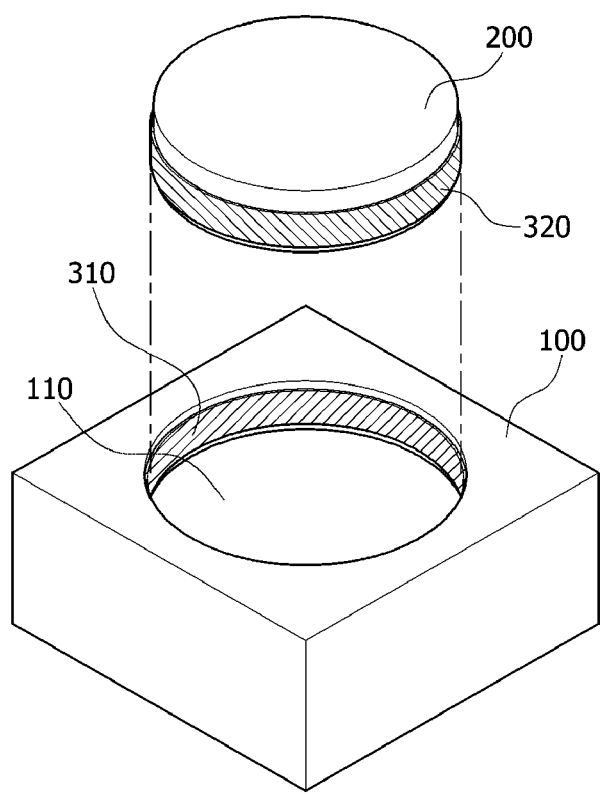
FIGS. 1 and 2 are, respectively, an exploded perspective view and a sectional view of a fixed mouse according to a first embodiment of the present invention.
Figure 2:
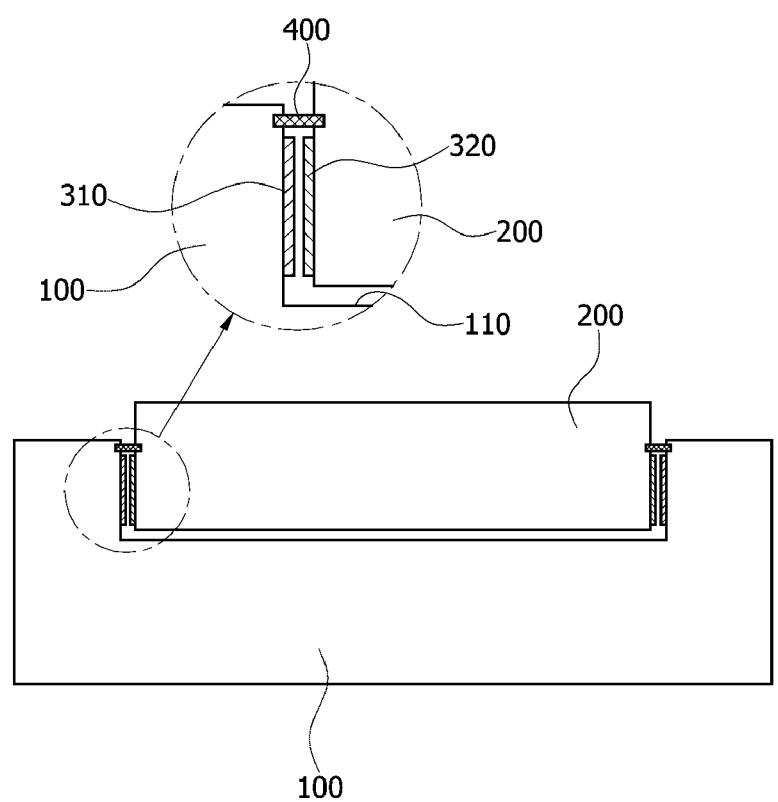

FIGS. 1 and 2 are, respectively, an exploded perspective view and a sectional view of a fixed mouse according to a first embodiment of the present invention.

As shown in FIGS. 1 and 2, the fixed mouse according to the present invention includes a housing 100, a movable body 200, a direction sensing means 310 and a speed sensing means 320. The housing 100 has an insert depression 110 therein. The movable body 200 is entirely or partially inserted into the insert depression 110. The direction sensing means 310 is provided on an inner side surface of the insert depression 110. The direction sensing means 310 senses a direction in which external force is applied to the movable body 200 and generates a signal to move a pointer in a corresponding direction. The speed sensing means 320 is provided on an outer side surface of the movable body 200. The speed sensing means 320 senses an intensity with which external force is applied to the movable body 200 and generates a signal to vary the speed at which the pointer moves.

The movable body 200 is inserted into the insert depression 110 and is operated in such a way that when a user pushes the movable body 200 in a horizontal direction, the direction sensing means 310 and the speed sensing means 320 come into contact with each other to move the pointer or vary the speed at which the pointer moves. The movable body 200 may have a signal input button or a scroll wheel for the sake of user convenience. Such a signal input button and a scroll wheel have been used in typical computer mouses, therefore detailed explanation will be omitted.

As illustrated in this embodiment, the direction sensing means 310 and the speed sensing means 320 may have touch sensor structures. Alternatively, the direction sensing means 310 and the speed sensing means 320 may comprise a plurality of switches which are provided on the outer side surface of the movable body 200 and the inner side surface of the insert depression 110. As such, the direction sensing means 310 and the speed sensing means 320 are not limited to special structures and can have any type of structure, so long as they can measure the direction in which the movable body 200 moves and the intensity of the force which moves the movable body 200.

FIG. 2 illustrates a state in which the movable body 200 is disposed in a central portion of the insert depression 110. In this state, the direction sensing means 310 and the speed sensing means 320 are spaced apart from each other so that neither touch nor pressure is applied to the direction sensing means 310 or to the speed sensing means 320. Thus, the pointer does not move.

From the state of FIG. 2, when the user holds the movable body 200 with his/her hand and horizontally moves it in one direction, the direction sensing means 310 and the speed sensing means 320 come into contact with each other. Then, the direction sensing means 310 generates a signal to move the pointer in a direction corresponding to the position at which the contact force is applied to the direction sensing means 310, in other words, in the direction in which the movable body 200 moves.

Furthermore, the speed sensing means 320 increases or reduces the speed of the pointer in response to the intensity of pressure applied thereto, in other words, in response to the intensity of the force with which the movable body 200 moves. In detail, the speed sensing means 320 is configured in such a way that the speed of the pointer is controlled in response to the intensity of contact pressure applied to the speed sensing means 320 after it has come into contact with the direction sensing means 310. Hence, when the user pushes the movable body 200 with a comparatively large amount of force, the pointer moves rapidly. When the user pushes the movable body 200 with a comparatively small amount of force, the pointer moves slowly.

As such, the fixed mouse of the present invention separately includes the direction sensing means 310 for generating a signal to control the movement direction of the pointer, and the speed sensing means 320 for generating a signal to control variation in speed of the pointer. Therefore, even if either the direction sensing means 310 or the speed sensing means 320 is damaged, it is possible to replace only the damaged element with a new one, facilitating maintenance and repair of the fixed mouse. In addition, the installation positions of the direction sensing means 310 and the speed sensing means 320 can be freely modified, thus increasing the design freedom.

In the embodiment, it is preferable that the movable body 200 and the insert depression 110 be cylindrical and the direction sensing means 310 and the speed sensing means 320 be respectively provided around the entire inner side surface of the insert depression 110 and the entire outer side surface of the movable body 200 so that even though the movable body 200 moves in any direction, the same intensity of contact pressure is applied to the direction sensing means 310 and the speed sensing means 320. Here, the direction sensing means 310 and the speed sensing means 320 may be respectively continuously formed around the entire inner side surface of the insert depression 110 and the entire outer side surface of the movable body 200. Alternatively, each of the direction sensing means 310 and the speed sensing means 320 may comprise a plurality of pieces which are arranged at positions spaced apart from each other at regular intervals around the inner side surface of the insert depression 110 or the outer side surface of the movable body 200.

Meanwhile, if the state of contact between the direction sensing means 310 and the speed sensing means 320 is maintained even after the user releases the movable body 200 after pushing the movable body 200 in one direction such that the direction sensing means 310 and the speed sensing means 320 come into contact with each other, the pointer undesirably continuously moves despite the fact that the user has stopped pushing the movable body 200 in the one direction.

To avoid this problem, the fixed mouse of the present invention includes an elastic member 400. In detail, a first end of the elastic member 400 is coupled to the inner side surface of the insert depression 110, and a second end thereof is coupled to the movable body 200. Thus, when no external force is applied to the movable body 200, the movable body 200 is returned to the central portion of the insert depression 110, in other words, to its original position, so that the direction sensing means 310 and the speed sensing means 320 are spaced apart from each other again. The elastic member 400 may be made of material, such as sponge or elastic synthetic resin, having appropriate elasticity. Alternatively, the elastic member 400 may comprise a spring, such as a coil spring, a plate spring, etc. Preferably, the elastic member 400 is configured in such a way that it covers the entirety of the space formed between the outer side surface of the movable body 200 and the inner side surface of the insert depression 110 so as to prevent dust and foreign substances from entering the space between the outer side surface of the movable body 200 and the inner side surface of the insert depression 110.

Furthermore, the elastic member 400 for returning the movable body 200 to its original position may comprise a pair of magnets which are arranged to generate attractive force therebetween, and one of which is fastened to the housing 100 while the other is fastened to the movable body 200. As such, the elastic member 400 may have any structure, so long as it can return the movable body 200 to its original position so that when no external force is applied to the movable body 200, no pressure is applied to the pressure sensing means.

In FIGS. 1 and 2, although the direction sensing means 310 and the speed sensing means 320 have been illustrated as being configured in such a way that only when the movable body 200 moves can the direction sensing means 310 and speed sensing means 320 which have been spaced apart from each other be brought into contact with each other, the direction sensing means 310 and the speed sensing means 320 may be provided in contact with each other. In this case, the direction sensing means 310 and the speed sensing means 320 are configured in such a way that when the user applies pressure to the movable body 200 in a horizontal direction, if the intensity of pressure applied to the movable body 200 is greater than a preset reference value, the direction sensing means 310 generates a control signal to move the pointer, and the speed sensing means 320 generates a control signal to vary the speed of the pointer in response to the variation in the intensity of pressure applied thereto.

As such, in the case where the direction sensing means 310 and the speed sensing means 320 are configured to always be in contact with each other, noise can be prevented from occurring when the direction sensing means 310 and the speed sensing means 320 which have been spaced apart come into contact with each other. In addition, because the movable body 200 is prevented from undesirably moving, the manipulability of the movable body 200 can be enhanced. Moreover, dust and foreign substances can be effectively prevented from entering the space between the direction sensing means 310 and the speed sensing means 320.

Meanwhile, the direction sensing means 310 may be configured in such a way that when another object comes into contact with the direction sensing means 310 or when contact pressure is applied thereto after another object has come into contact with the direction sensing means 310, a control signal to move the pointer in a corresponding direction is generated. Alternatively, the direction sensing means 310 may be configured in such a way that when another object is close to the direction sensing means 310, a control signal to move the pointer in a corresponding direction is generated. For example, the direction sensing means 310 may comprise an optical sensor, an ultrasonic sensor or a magnetic sensor. Thus, in this case, even though the speed sensing means 320 is close to the direction sensing means 310 in a degree rather than completely coming into contact with the direction sensing means 310, a control signal to move the pointer in a corresponding direction is generated. As such, in the case where the direction sensing means 310 has this structure, contact between the direction sensing means 310 and the speed sensing means 320 is not required, so that the direction sensing means 310 and the speed sensing means 320 can be prevented from being damaged by contact therebetween. Moreover, noise can be prevented from occurring due to contact between the direction sensing means 310 and the speed sensing means 320.

Figure 3:
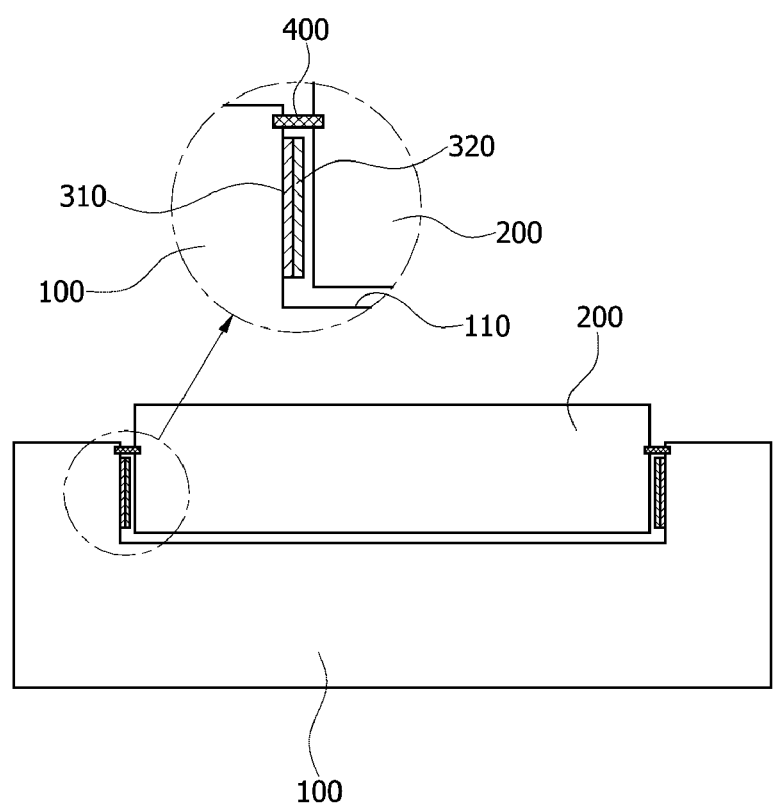
FIGS. 3 through 5 are sectional views showing modifications of installation positions of a direction sensing means and a speed sensing means according to the first embodiment of the present invention.
Figure 4:
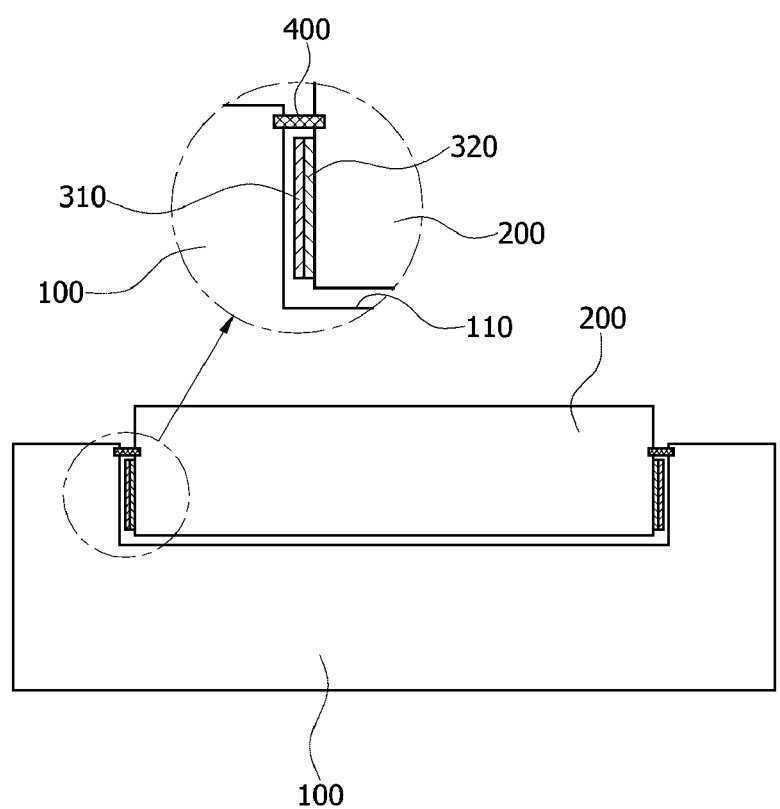
Figure 5:
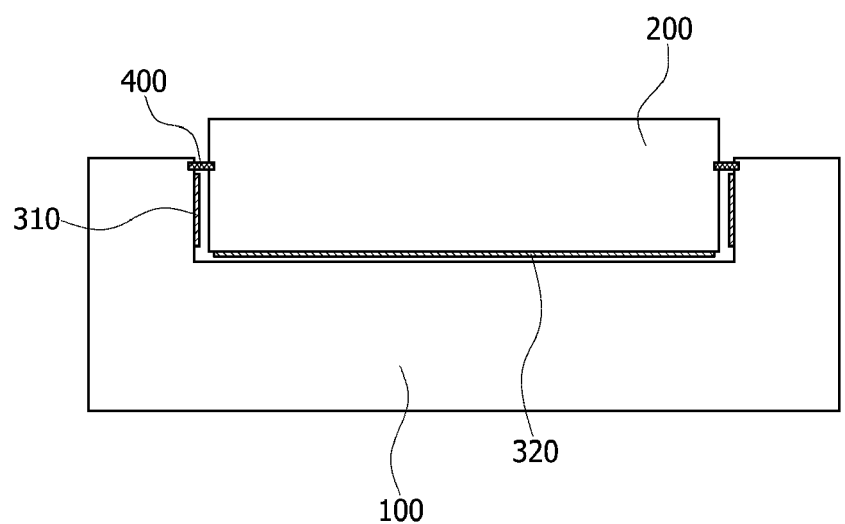

FIGS. 3 through 5 are sectional views showing modifications of the installation positions of the direction sensing means 310 and the speed sensing means 320 according to the present invention.

In FIGS. 1 and 2, although the direction sensing means 310 has been illustrated as being installed on the inner side surface of the insert depression 110 and the speed sensing means 320 has been illustrated as being installed on the outer side surface of the movable body 200, the installation positions of the direction sensing means 310 and the speed sensing means 320 may be switched.

Furthermore, as shown in FIGS. 3 and 4, the direction sensing means 310 and the speed sensing means 320 may overlap each other and be provided on either the outer side surface of the movable body 200 or the inner side surface of the insert depression 110.

In the case where the direction sensing means 310 and the speed sensing means 320 are provided as shown in FIG. 3, the direction sensing means 310 generates a control signal to move the pointer in a corresponding direction depending on whether the movable body 200 comes into contact with the direction sensing means 310. When pressure which is applied to the speed sensing means 320 by the contact with the movable body 200 is greater than a preset reference value, the speed sensing means 320 generates a control signal to vary the speed of the pointer. In the case where the direction sensing means 310 and the speed sensing means 320 are provided as shown in FIG. 4, the direction sensing means 310 generates a control signal to move the pointer in a corresponding direction depending on whether the direction sensing means 310 comes into contact with the side surface of the insert depression 110. When pressure which is applied to the speed sensing means 320 by the contact with the side surface of the insert depression 110 is greater than a preset reference value, the speed sensing means 320 generates a control signal that is used to vary the speed of the pointer.

When the direction sensing means 310 and the speed sensing means 320 are provided in the manner shown in FIGS. 3 and 4, there is an advantage in that the installation of the direction sensing means 310 and the speed sensing means 320 is facilitated.

Meanwhile, force may be applied to the movable body 200 downwards rather than being applied thereto only in the horizontal direction. In other words, the user may apply force to the movable body 200 only in a horizontal direction or, alternatively, the user may push the movable body 200 downwards and apply force thereto in a horizontal direction. Taking this into account, the direction sensing means 310 and the speed sensing means 320 may be configured in such a way that they separately receive the horizontal force and downward force which are applied to the movable body 200.

In detail, as shown in FIG. 5, in the fixed mouse of the present invention, the direction sensing means 310 may be provided around the outer side surface of the movable body 200, and the speed sensing means 320 may be provided under a lower surface of the movable body 200. Therefore, when the user applies force to the movable body 200 in only a horizontal direction, it is possible to only move the pointer in a corresponding direction without varying the speed of the pointer. When the user pushes the movable body 200 downwards and simultaneously applies force thereto in a horizontal direction, moving the pointer in a corresponding direction while varying the speed of the pointer can also be realized. In the fixed mouse having this structure, the user can selectively use the function of controlling the speed of the pointer, thus making it more convenient to use.

Furthermore, the installation position of the direction sensing means 310 may be modified to the outer side surface of the movable body 200. The speed sensing means 320 may be provided on a bottom of the insert depression 110 or an upper surface of the movable body 200, as long as it can receive downward force.

Moreover, the installation positions of the direction sensing means 310 and the speed sensing means 320 may be switched so that downward force is applied to the direction sensing means 310 and horizontal force is applied to the speed sensing means 320. In this case, it is preferable that the direction sensing means 310 have an annular shape the inner diameter of which is greater than the diameter of the movable body 200 and be disposed around the perimeter of the bottom of the insert depression 110. Then, if only vertical force (downward force) is applied to the movable body 200 without horizontal force being applied thereto, no force is applied to the direction sensing means 310 that is disposed on the bottom of the insert depression 110, because the movable body 200 is disposed inside the annular direction sensing means 310. Thus, a signal to move the pointer is not generated. However, if the movable body 200 is moved in a horizontal direction by horizontal force, the lower surface of the movable body 210 comes into contact with the direction sensing means 310. Thus, the direction sensing means 310 generates a control signal to move the pointer in a direction corresponding to the position at which the movable body 200 comes into contact with the direction sensing means 310.

Figure 6:
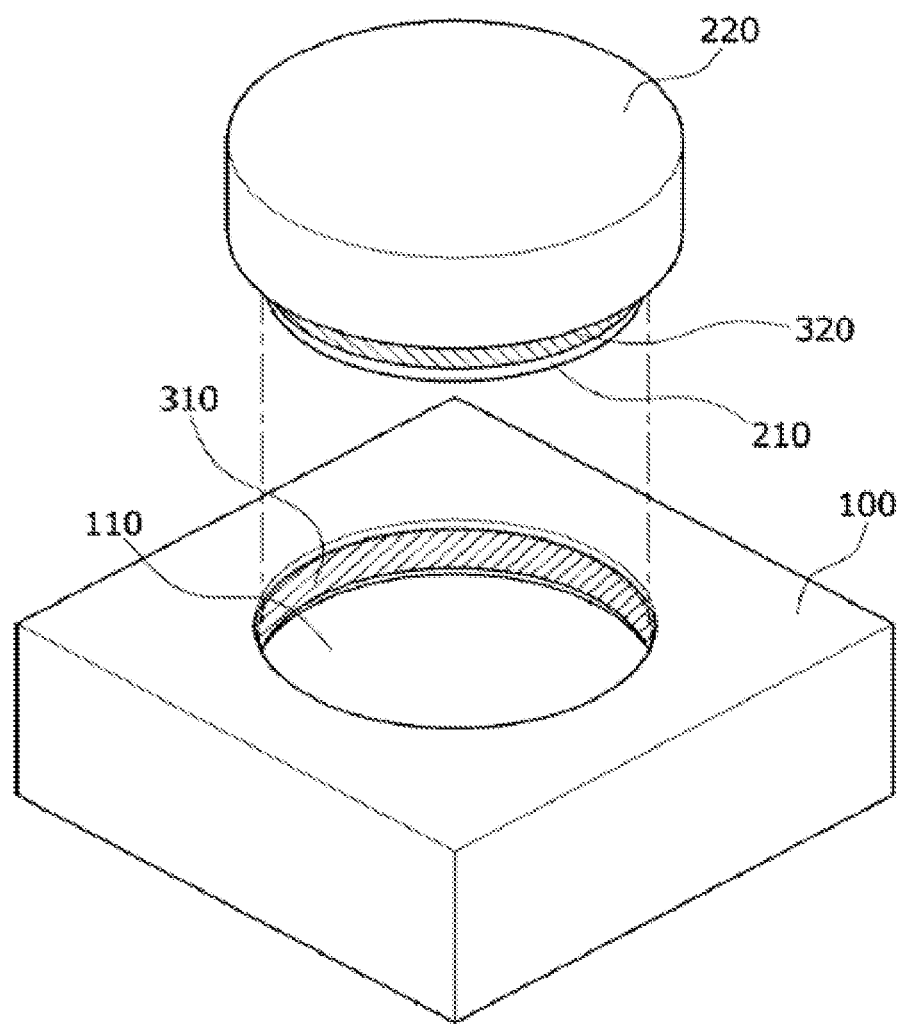
FIG. 6 is a sectional view showing a handle provided on a movable body of the fixed mouse according to the present invention.

FIG. 6 is a sectional view showing a handle provided on the movable body of the fixed mouse according to the present invention.

As shown in FIG. 6, the fixed mouse of the present invention may further include the handle 220 which is provided on an upper end of the movable body 200 that is disposed outside the insert depression 110. As such, when the handle 220 is provided on the upper end of the movable body 200, the user can conveniently hold the handle 220 before moving the movable body 200. Therefore, the user can more easily apply force to the movable body 200. In particular, if the handle 220 is designed in an ergonomic streamline shape in the same manner as that of the typical mouse, the structural problem of the movable body 200 having a cylindrical shape that makes it inconvenient for the user to hold can be more effectively solved. The handle 220 may be coupled to the movable body 200 by fitting it over the upper end of the movable body 200 or, alternatively, it may be coupled to the movable body 200 by a separate fastening unit.

Preferably, to prevent dust and foreign substances from entering the space between the outer side surface of the movable body 200 and the inner side surface of the insert depression 110, the handle 220 is formed in a shape in which a lower end of the handle 220 covers the space between the outer side surface of the movable body 200 and the inner side surface of the insert depression 110.

Furthermore, as shown in FIG. 6, in the case where the handle 220 is provided on the movable body 200, the elastic member 400 which controls the position of the movable body 200 may be coupled to the handle 220 and the housing 100. For example, as shown in FIG. 6, a stepped portion is formed in an upper end of the inner side surface of the insert depression 110. The first end of the elastic member 400 is coupled to a circumferential outer surface of the lower end of the handle 220 and the second end thereof is coupled to the stepped portion of the insert depression 110.

To minimize the distance that the movable body 200 moves, the space between the outer side surface of the movable body 200 and the inner side surface of the insert depression 110 must be very small. In the case of FIGS. 1 through 5, the very small space may make it difficult to install the elastic member 400 in the space between the outer side surface of the movable body 200 and the inner side surface of the insert depression 110. On the other hand, as shown in FIG. 6, in the case where the handle 220 is provided on the movable body 200, there are advantages in that the installation of the elastic member 400 is facilitated, and maintenance and repair of the elastic member 400 is made convenient.

Figure 7:
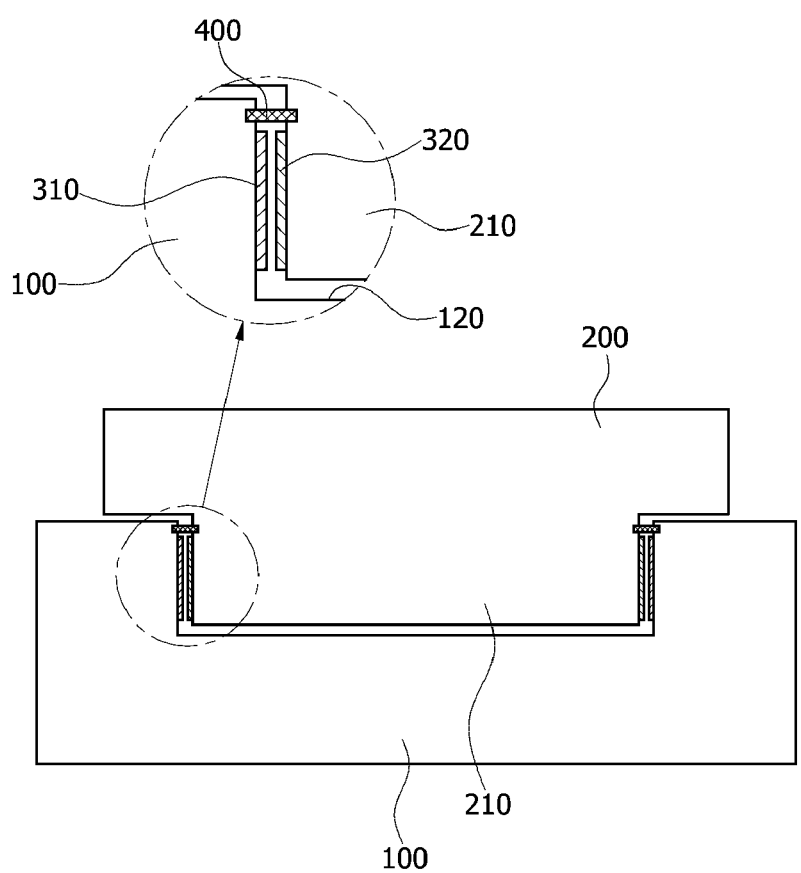
FIGS. 7 and 8 are, respectively, an exploded perspective view and a sectional view showing a fixed mouse according to a second embodiment of the present invention.
Figure 8:
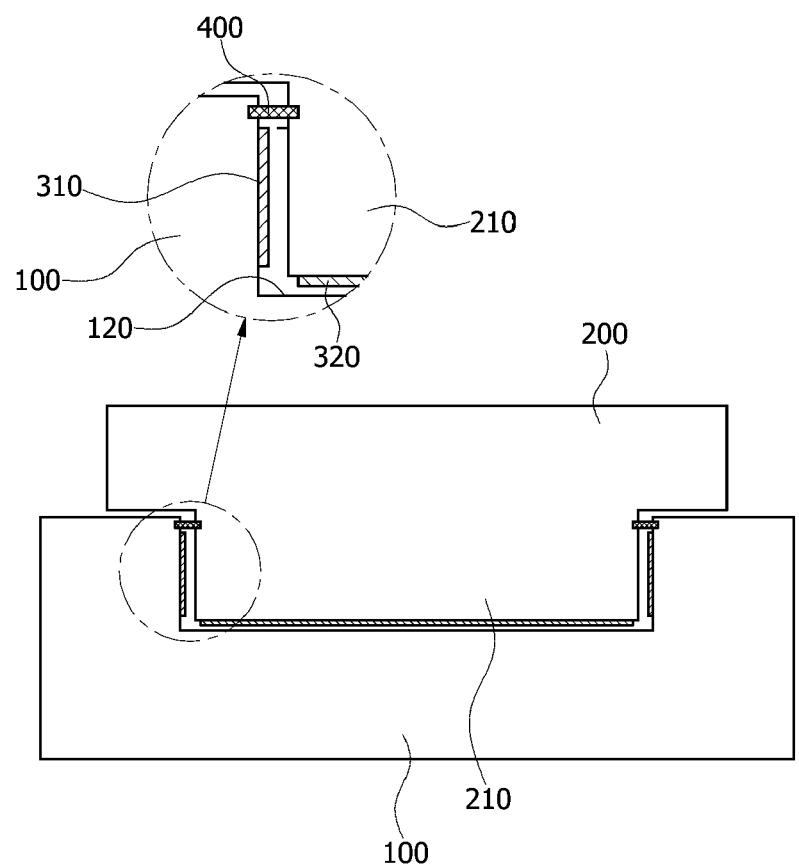
Figure 9:
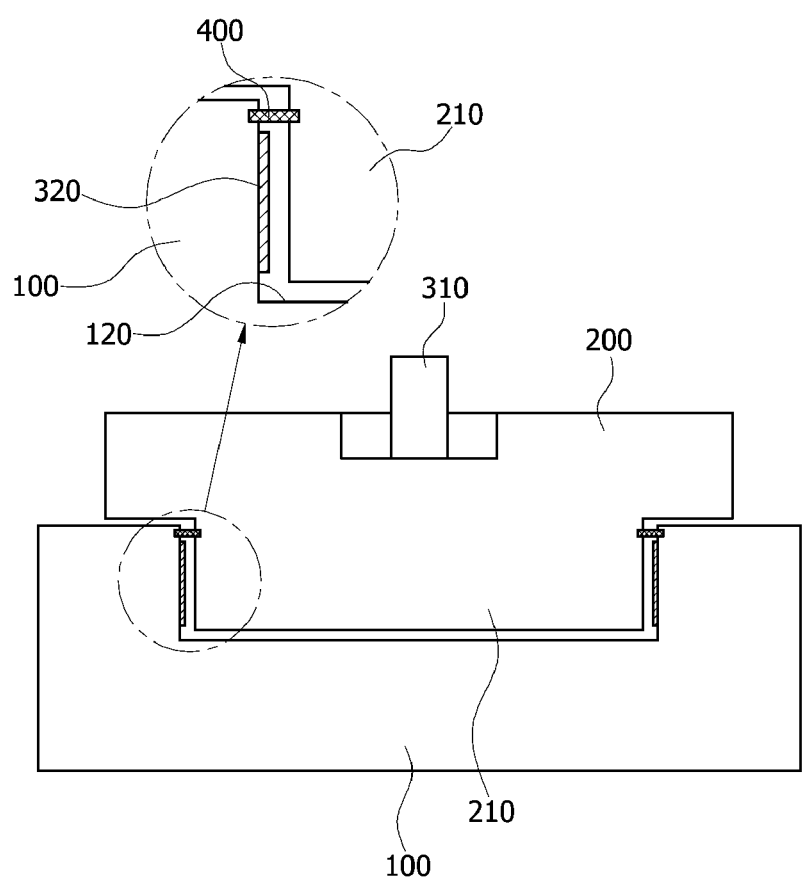
FIG. 9 is a sectional view showing a modification of the installation positions of the direction sensing means and speed sensing means according to the second embodiment of the present invention.

FIGS. 7 and 8 are, respectively, an exploded perspective view and a sectional view showing a fixed mouse according to a second embodiment of the present invention. FIG. 9 is a sectional view showing a modification of installation positions of a direction sensing means 310 and a speed sensing means 320 according to the second embodiment of the present invention.

The fixed mouse according to the second embodiment of the present invention is configured in such a way that a boss 210 protrudes from a lower surface of a movable body 200 and only the boss 210 is inserted into a receiving depression 120 formed in an upper surface of a housing 100 rather than the entirety of the lower surface of the movable body 200 being inserted into the housing 100.

The direction sensing means 310 is provided on either an outer side surface of the boss 210 or an inner side surface of the receiving depression 120. The speed sensing means 320 is provided on the other one of the outer side surface of the boss 210 and an inner side surface of the receiving depression 120. Furthermore, the direction sensing means 310 and the speed sensing means 320 may overlap each other and be provided on either the outer side surface of the boss 210 or the inner side surface of the receiving depression 120. Alternatively, the direction sensing means 310 may be provided on either the outer side surface of the boss 210 or the inner side surface of the receiving depression 120, and the speed sensing means 320 may be provided on an upper surface of the movable body 200, an upper end of the boss 210, a lower surface of the boss 210, or a bottom of the receiving depression 120 (refer to FIG. 9).

The effects of modifying the installation positions of the direction sensing means 310 and the speed sensing means 320 are the same as those of the first embodiment of FIGS. 1 through 5, therefore their detailed explanation will be omitted.

The fixed mouse according to the second embodiment of FIGS. 7 through 9 is characterized in that the external shape of the movable body 200 can be freely modified because the direction sensing means 310 and the speed sensing means 320 are provided on the boss 210 rather than on the outer side surface of the movable body 200.

In the first embodiment of FIGS. 1 through 6, the direction sensing means 310 is provided around the outer side surface of the movable body 200 or the inner side surface of the insert depression 110. Thus, to receive pressure equally in all directions, the direction sensing means 310 must have an annular shape, and the movable body 200 must have a cylindrical shape. Hence, it is inconvenient for the user to hold the movable body 200 with his/her hand. However, as shown in the second embodiment, in the case where the direction sensing means 310 is provided on the boss 210, only the boss 210 and the receiving depression 120 have cylindrical shapes but the movable body 200 can have any type of shape without restriction. In other words, in the case of the second embodiment of FIGS. 7 through 9, the movable body 200 may have an ergonomic streamlined shape the same as that of the typical mouse. Therefore, the user can easily master how to use the fixed mouse without having any unpleasant feelings.

Figure 10:
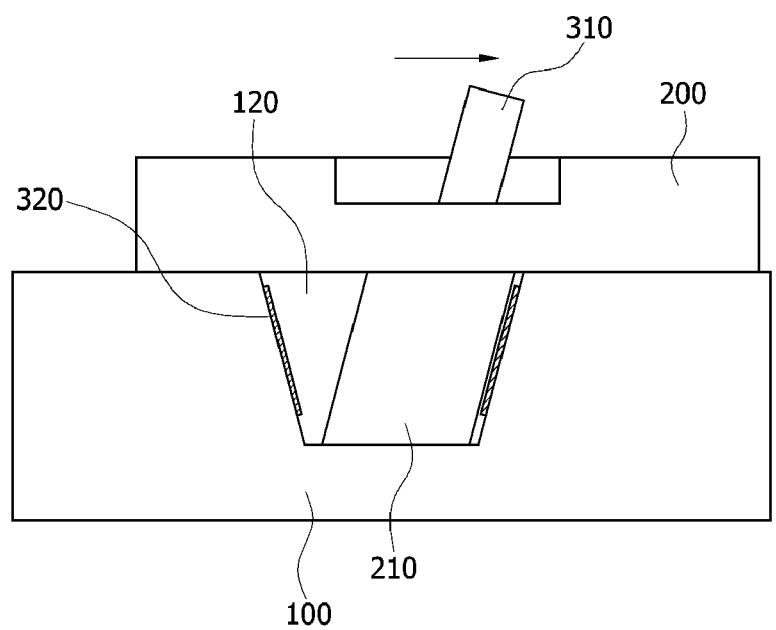
FIG. 10 is a sectional view showing a fixed mouse, according to a third embodiment of the present invention.

FIG. 10 is a sectional view showing a fixed mouse, according to a third embodiment of the present invention.

As shown in FIG. 10, the fixed mouse according to the third embodiment may include a direction sensing means 310 which has a joystick structure and is provided on an upper surface of a movable body 200.

In the case where the direction sensing means 310 has the joystick structure and is provided on the upper surface of the movable body 200, when the user manipulates only the joystick with a force which is not enough to move the movable body 200, the pointer moves at a constant speed. When the user manipulates the joystick with a comparatively large amount of force sufficient to move the movable body 200, not only the position of the pointer but also the speed of the pointer varies.

As such, the fixed mouse having the structure of FIG. 10 is advantageous in that the user more conveniently optionally uses a function of varying the speed of the pointer.

Figure 11:
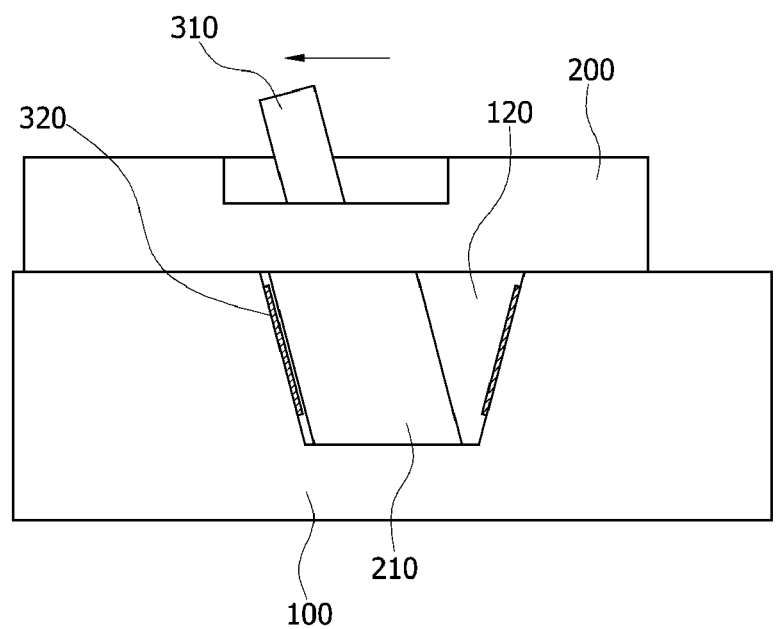
FIGS. 11 through 13 are sectional views showing a fixed mouse, according to a fourth embodiment of the present invention.
Figure 12:
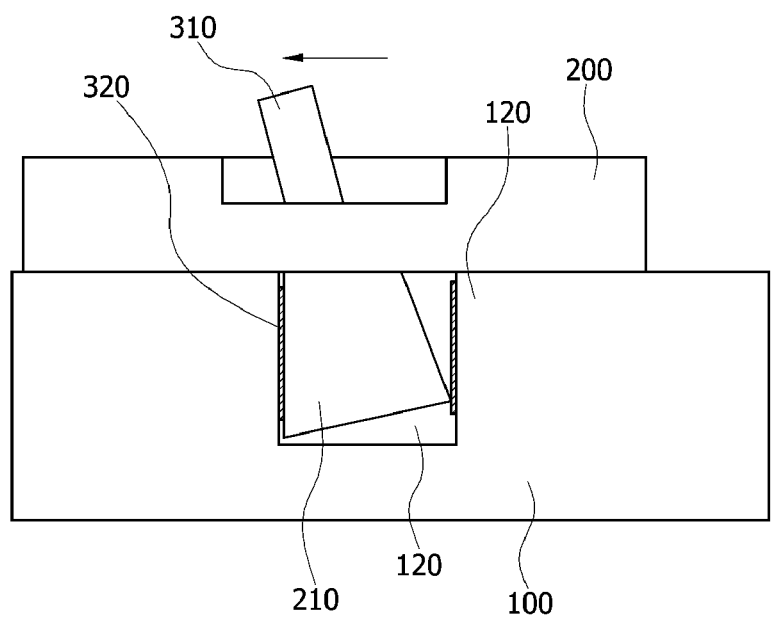
Figure 13:
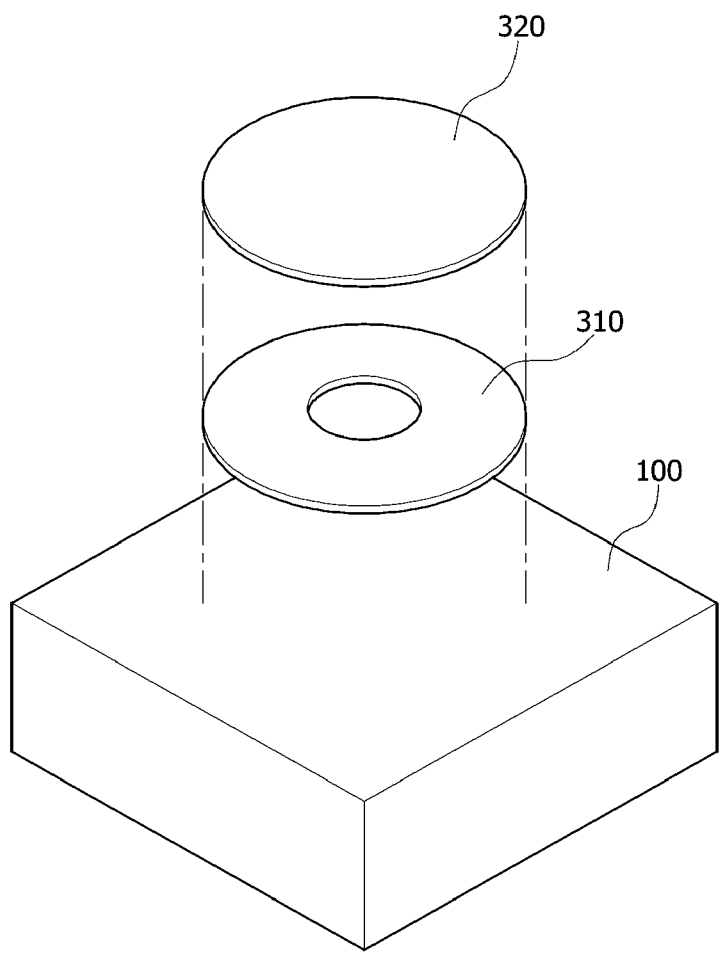

FIGS. 11 through 13 are sectional views showing a fixed mouse, according to a fourth embodiment of the present invention.

As shown in FIGS. 11 and 12, a boss 210 may be configured in such a way that an end thereof is coupled to the surface of the receiving depression 120 and that when the movable body 200 moves, the boss 210 is inclined in the movement direction of the movable body 200 to compress the speed sensing means 320.

As such, in the case where the element for compressing the speed sensing means 320 is configured in such a way that it is inclined in the direction in which the movable body 200 moves, whether the speed sensing means 320 has been compressed or not can be more clearly determined, so that whether the function of varying the speed of the pointer is used or not can be more clearly determined. Furthermore, because the movable body 200 is coupled to the housing 100 by the boss 210, the movable body 200 is prevented from being undesirably removed from the housing 100.

In this embodiment, as shown in FIGS. 11 and 12, the receiving depression 120 preferably has a shape in which the width thereof increases from the bottom to the top so that when the boss 210 is inclined in one direction, the inner side surface of the receiving depression 120 is parallel to the outer side surface of the boss 210. In the case where the receiving depression 120 has the above-mentioned shape, the entire surface of the speed sensing means 320 provided on the inner side surface of the receiving depression 120 can come into contact with the boss 210. Thus, force that is generated by movement of the movable body 200 can be more reliably applied to the boss 210.

Furthermore, unlike the case of FIGS. 11 and 12, as shown in FIG. 13, the inner side surface of the receiving depression 120 may be perpendicular to the bottom thereof, and the boss 210 may have a shape such that the diameter thereof increases from the upper end to the lower end. In the same manner, in the case where the boss 210 has a shape in which the diameter thereof increases to the lower end, there is also an advantage in that when the boss 210 is inclined by movement of the movable body 200, the entire surface of the speed sensing means 320 can come into contact with the boss 210.

Figure 14:
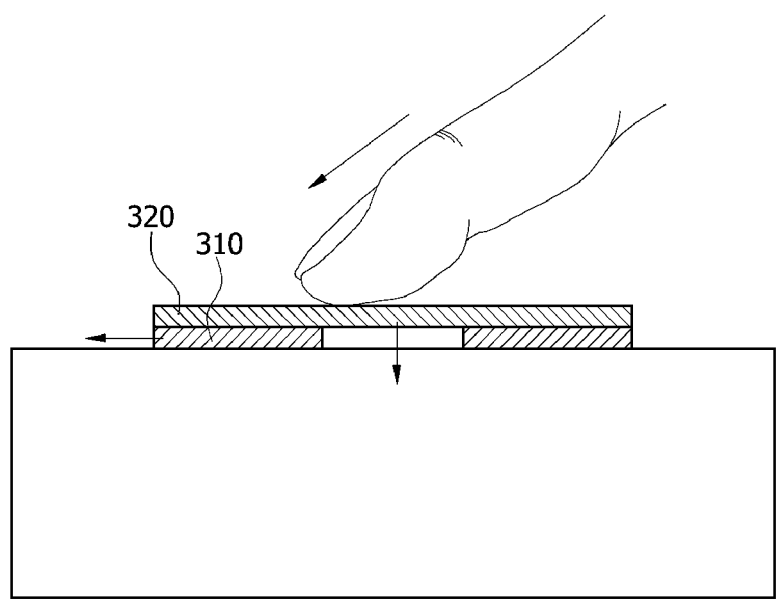
FIGS. 14 through 16 are sectional views showing a fixed mouse, according to a fifth embodiment of the present invention.
Figure 15:
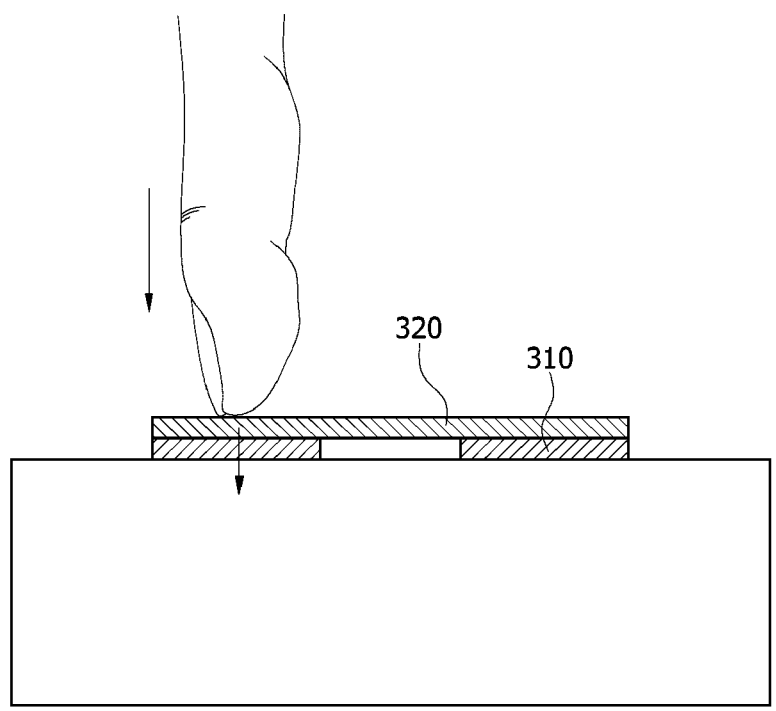
Figure 16:
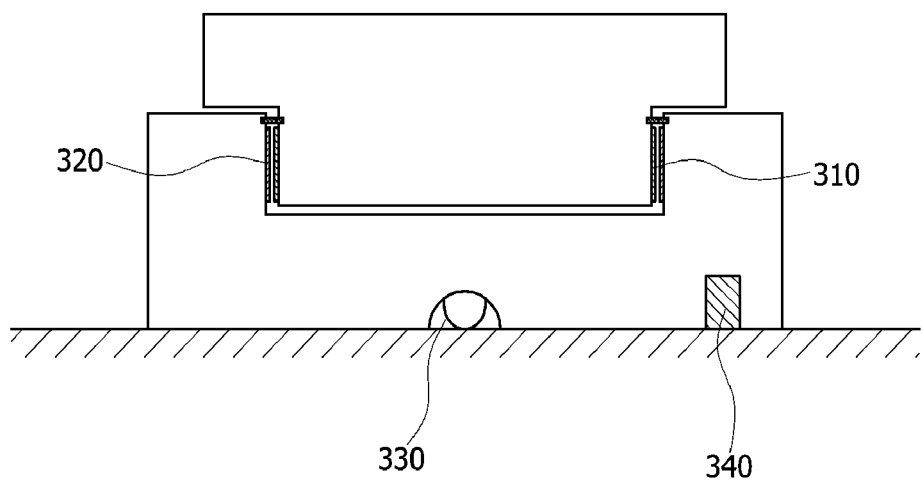

FIGS. 14 through 16 are sectional views showing a fixed mouse, according to a fifth embodiment of the present invention.

The fixed mouse according to the fifth embodiment is configured such that force of the user is directly transmitted to a speed sensing means 320 and a direction sensing means 310.

In detail, as shown in FIGS. 14 and 15, the fixed mouse according to the fifth embodiment includes a housing 100, the direction sensing means 310 which senses the direction of external force which is applied thereto sideways and then a control signal to move the pointer, and the speed sensing means 320 which senses the intensity of external force which is applied thereto in a vertical direction and then generates a control signal to vary the speed of the pointer. The direction sensing means 310 and the speed sensing means 320 have a touchpad structure and are installed on an upper surface of the housing 100 in such a way that they are placed on top of each other.

As shown in FIG. 15, when the user pushes the direction sensing means 310 and the speed sensing means 320 with his/her finger, typically, sideways, the force applied to the direction sensing means 310 and the speed sensing means 320 includes a horizontal force component and a vertical force component.

At this time, the direction sensing means 310 senses the horizontal force component and generates a control signal to move the pointer in a corresponding direction, and the speed sensing means 320 senses the vertical force component and generates a control signal to vary the speed of the pointer. For example, when the finger of the user comes into contact with the upper surface of the speed sensing means 320, the speed sensing means 320 determines the speed of the pointer. When the user pushes it sideways, the direction sensing means 310 senses the direction in which the user pushes it and then generates to move the pointer in the corresponding direction.

Such a touchpad structure which senses the direction and intensity of force applied thereto has been widely used in various kinds of mobile communication terminals or portable electronic devices. Thus, the detailed explanation of the touchpad structure will be skipped.

In this embodiment, although the speed sensing means 320 has been illustrated as being placed on the direction sensing means 310, the positions of the direction sensing means 310 and the speed sensing means 320 may be switched. In other words, the speed sensing means 320 may be first placed on the upper surface of the housing 100 and the direction sensing means 310 may be placed on the speed sensing means 320.

Preferably, the direction sensing means 310 and the speed sensing means 320 have disk shapes so that even if the user applies force thereto in any direction, the force is evenly transmitted thereto. Furthermore, the direction sensing means 310 may have an annular shape which has an opening at the central portion thereof so that when the user brings his/her finger into contact with the central portion of the speed sensing means 320, the direction sensing means 310 does not generate a control signal to move the pointer in a direction.

Furthermore, as shown in FIG. 16, the direction sensing means 310 may be configured such that when external force is applied thereto at a position spaced apart from a reference point (for example, a center point of the opening) in a direction by a predetermined distance, the direction sensing means 310 generates a control signal to move the pointer in a direction corresponding to the direction oriented from the reference point to the position at which the external force is applied. Of course, at this time, the speed sensing means 320 senses the intensity of external force and generates a control signal to vary the speed of the pointer in the same manner as that of the embodiment of FIGS. 14 and 15.

In the case of such structure, the direction in which the pointer moves and the speed at which the pointer moves can be determined at the same time by sensing only the force which presses vertically a portion of the annular direction sensing means 310 that is spaced apart from the opening without sensing a horizontal force component.

Therefore, the user can control both the movement direction and the speed of the pointer merely by applying vertical force to the direction sensing means 310 and the speed sensing means 320 at a position spaced apart from the center thereof in a desired direction, rather than by applying vertical and horizontal forces separately to an overlapping portion between the direction sensing means 310 and the speed sensing means 320 or applying external force to them in an inclined direction.

As shown in the embodiment of FIGS. 14 through 16, in the case where the fixed mouse is configured in such a way that force is directly applied from the user to the direction sensing means 310 and the speed sensing means 320, the movable body 200 can be removed. Therefore, the construction of the fixed mouse is simple. In addition, the size of the product can be markedly reduced.

Furthermore, the speed sensing means 320 may be configured such that when the direction sensing means 310 detects two or more touches or that contact pressure has been applied two or more times within a predetermined time, the speed at which the pointer moves increases.

For example, when the user lightly touches a desired portion of the direction sensing means 310 or the speed sensing means 320 in one direction two or more times within a short time, the direction sensing means 310 detects the two or more touches or the two or more times of contact pressure application. Then, the speed sensing means 320 may increase the speed of the pointer, regardless of conducting the operation of increasing the speed of the pointer depending on the force used to press downwards. Therefore, to increase the speed of the pointer, the user only needs to touch the upper surface of the direction sensing means 310 or the speed sensing means 320 two or more times within a short time span without the need to apply a large downward pressing force thereto.

The speed sensing means 320 which is configured such that the speed of the pointer increases depending on the number of times the user applies force thereto within a predetermined amount of time can be applied not only to the embodiment of the FIGS. 14 through 16 but also to other embodiments of FIGS. 1 through 13.

Figure 17:
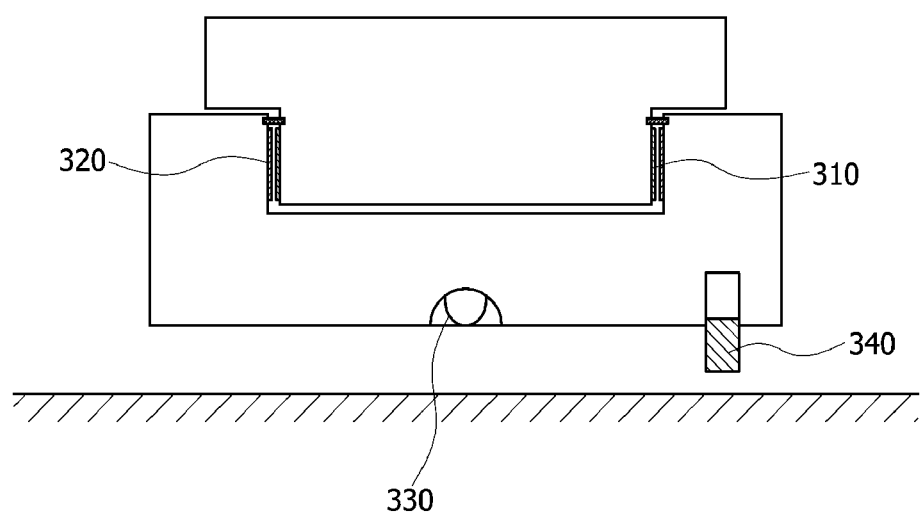
FIGS. 17 through 18 are sectional views showing a fixed mouse, according to a sixth embodiment of the present invention.
Figure 18:
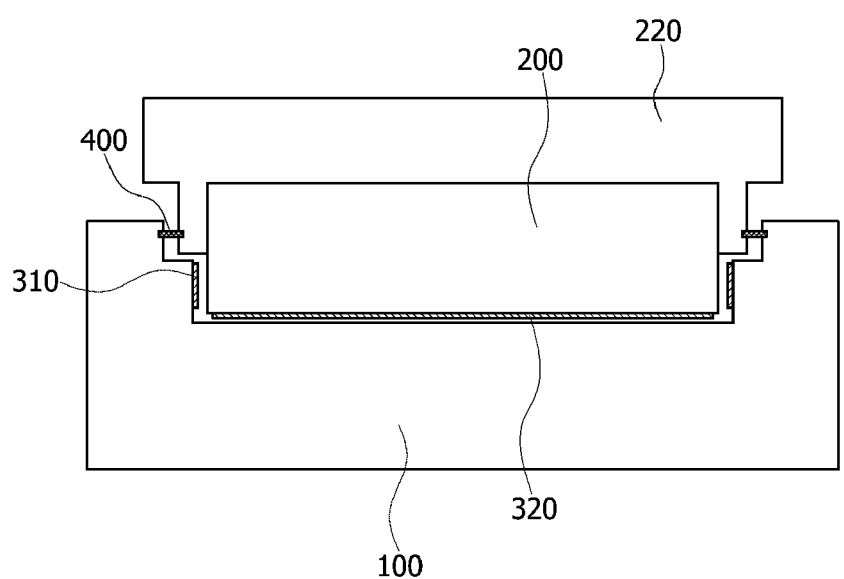

FIGS. 17 through 18 are sectional views showing a fixed mouse, according to a sixth embodiment of the present invention.

The fixed mouse according to the sixth embodiment of the present invention further includes a movement sensing means 330 which is provided under a lower surface of a housing 100 and detects movement of the housing 100 to generate a control signal to move the pointer. The movement sensing means 330 may comprise any type of structure, for example, an optical sensor which is used in a typical optical mouse, or a ball-roller-encoder assembly which is used in a typical ball mouse, as long as it can detect movement of the housing 100. In other words, the movement sensing means 330 having the above-mentioned structure has been used in the typical computer mouse in a variety of different manners, therefore its detailed explanation will be omitted.

As such, in the case where the fixed mouse further has the movement sensing means 330, the user may move the entire housing 100 to use the fixed mouse in the same manner as that of the typical mouse.

Furthermore, the fixed mouse may further include a signal transmission switch 340 which is provided under the lower surface of the housing 100 to detect whether the lower surface of the housing 100 has been placed on a support surface. In this case, the fixed mouse is configured in such a way that, as shown in FIG. 17, when the housing 100 is placed on the support surface, the movement sensing means 330 is operated, and as shown in FIG. 18, when the housing 100 is spaced apart from the support surface, the movement sensing means 330 is not operated.

The signal transmission switch may comprise various types of switches, including not only a mechanical switch, a portion of which is extracted from or retracted into the housing 100 to detect whether the housing 100 is placed on the support surface, as shown in this embodiment, but also an optical sensor and a magnetic sensor.

As such, in the case where the fixed mouse further has the signal transmission switch 340, the user can easily select whether to operate the movement sensing means 330 only depending on turning the signal transmission switch 340 on or off.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A fixed mouse, comprising:
a housing having an insert depression;
a movable body, a portion of which is inserted into the insert depression;

a direction sensor configured to detect a direction in which an external force is applied to the movable body and generate a signal to move a pointer in a corresponding direction;

a speed sensor configured to detect an intensity of the external force applied to the movable body and generate a signal to vary a speed of the pointer in response to the intensity of the external force;

an elastic member applying elastic force to the movable body so that the movable body is prevented from moving when no external force is applied to the movable body; and a handle provided on an upper end of the movable body that is disposed outside the insert depression, wherein the speed sensor is separately provided from the direction sensor, wherein the direction sensor generates a signal to move the pointer in the direction corresponding to the position at which the contact force is applied to the direction sensor and the speed sensor increases or reduces the speed of the pointer in response to the intensity of pressure applied, in response to the direction sensor and the speed sensor coming into contact with each other, wherein the handle is formed in a shape in which a lower end of the handle covers the space between an outer side surface of the movable body and an inner side surface of the insert depression, wherein a stepped portion is formed in an upper end of the inner side surface of the insert depression, wherein a first end of the elastic member is coupled to a circumferential outer surface of a lower end of the handle and a second end is coupled to the stepped portion of the insert depression, and wherein the direction sensor has a disk or annular shape formed around a reference point.

2. The fixed mouse according to claim 1, wherein the direction sensor is provided on either the outer side surface of the movable body or the inner side surface of the insert depression, and the speed sensor is provided on a remaining one of the outer side surface of the movable body and the inner side surface of the insert depression.

3. The fixed mouse according to claim 1, wherein each of the direction sensor and the speed sensor is arranged in a regular spaced arrangement around in one of an outer side surface of the movable body and an inner side surface of the insert depression, or is provided around the entire outer side surface of the movable body or the entire inner side surface of the insert depression.

4. The fixed mouse according to claim 1, wherein when another object comes into contact with the direction sensor or a contact pressure is applied thereto after another object has been put in contact with the direction sensor, a signal to move the pointer in a corresponding direction is generated.

5. The fixed mouse according to claim 1, wherein when another object is close to the direction sensor, a signal to move the pointer in a corresponding direction is generated.

6. The fixed mouse according to claim 1, wherein the direction sensor includes a joystick and is provided on the upper surface of the movable body, a speed of the pointer is constant when the joystick is manipulated with a force which is not enough to move the movable body, a speed of the pointer is variable based on a comparatively large amount of force when the joystick is manipulated with a force which is sufficient to move the movable body.

7. The fixed mouse according to claim 1, wherein the direction sensor is provided on an outer side surface of the movable body or an inner side surface of the insert depression, and the speed sensor is provided on one of an upper surface of the movable body, a lower surface of the movable body, and a bottom of the insert depression.

8. A fixed mouse, comprising:

a housing having an insert depression;

a movable body, a portion of which is inserted into the insert depression;

a direction sensor configured to detect a direction in which a sideways external force is applied thereto and generate a signal to move a pointer in a corresponding direction;

a speed sensor configured to detect an intensity with which an external force is applied thereto in a vertical direction and generate a signal to vary a speed of the pointer in response to the intensity of the external force;

an elastic member applying elastic force to the movable body so that the movable body is prevented from moving when no external force is applied to the movable body; and a handle provided on an upper end of the movable body that is disposed outside the insert depression, wherein the speed sensor is separately provided from the direction sensor, wherein the direction sensor is provided around the outer side surface of the movable body, wherein the direction sensor generates a signal to move the pointer in the direction corresponding to the position at which the contact force is applied to the direction sensor and the speed sensor increases or reduces the speed of the pointer in response to the intensity of pressure applied, in response to the direction sensor and the speed sensor coming into contact with each other, wherein the speed sensor is provided under a lower surface of the movable body or on a bottom of the insert depression wherein the handle is formed in a shape in which a lower end of the handle covers the space between the outer side surface of the movable body and the inner side surface of the insert depression, wherein a stepped portion is formed in an upper end of the inner side surface of the insert depression, wherein a first end of the elastic member is coupled to a circumferential outer surface of a lower end of the handle and a second end is coupled to the stepped portion of the insert depression, and wherein the direction sensor has a disk or annular shape formed around a reference point.

9. A fixed mouse, comprising:

a housing having an insert depression;

a movable body, a portion or entirety of which is inserted into the insert depression;

a speed sensor configured to detect an intensity with which sideways external force is applied thereto and generate a signal to vary a speed of the pointer in response to the intensity of the sideways external force;

a direction sensor configured to detect a direction in which an external force is applied thereto in a vertical direction and generate signal to move a pointer in a corresponding direction;

an elastic member applying elastic force to the movable body so that the movable body is prevented from moving when no external force is applied to the movable body; and a handle provided on an upper end of the movable body that is disposed outside the insert depression, wherein the speed sensor is separately provided from the direction sensor, wherein the speed sensor is provided around the outer side surface of the movable body and the speed sensor is provided under a lower surface of the movable body or on a bottom of the insert depression, wherein the direction sensor has an annular shape an inner diameter of which is greater than the diameter of the movable body and is disposed around the perimeter of the bottom of the insert depression and the movable body is disposed inside the annular direction sensor, wherein the direction sensor generates the signal when a lower surface of the movable body comes into contact with the direction sensor, wherein the handle is formed in a shape in which a lower end of the handle covers the space between the outer side surface of the movable body and the inner side surface of the insert depression, wherein a stepped portion is formed in an upper end of the inner side surface of the insert depression, wherein a first end of the elastic member is coupled to a circumferential outer surface of a lower end of the handle and a second end is coupled to the stepped portion of the insert depression, and wherein the direction sensor has an annular shape formed around a reference point.

* * * * *